US012049082B2

(12) United States Patent
Menzel

(10) Patent No.: US 12,049,082 B2
(45) Date of Patent: Jul. 30, 2024

(54) EFFICIENT INK JET PRINTING

(71) Applicant: FUJIFILM Dimatix, Inc., Lebanon, NH (US)

(72) Inventor: Christoph Menzel, New London, NH (US)

(73) Assignee: FUJIFILM Dimatix, Inc., Lebanon, NH (US)

( * ) Notice: Subject to any disclaimer, the term of this patent is extended or adjusted under 35 U.S.C. 154(b) by 121 days.

(21) Appl. No.: 17/987,433

(22) Filed: Nov. 15, 2022

(65) Prior Publication Data

US 2023/0150262 A1 May 18, 2023

Related U.S. Application Data

(60) Provisional application No. 63/279,795, filed on Nov. 16, 2021.

(51) Int. Cl.
*B41J 2/14* (2006.01)

(52) U.S. Cl.
CPC ................................ *B41J 2/14201* (2013.01)

(58) Field of Classification Search
CPC . B41J 2/14201; B41J 2202/12; B41J 2/14233
See application file for complete search history.

(56) References Cited

U.S. PATENT DOCUMENTS

| | | | | |
|---|---|---|---|---|
| 8,752,946 | B2 | 6/2014 | Wells, Jr. et al. | |
| 8,820,899 | B2 | 9/2014 | Hoisington et al. | |
| 2004/0004649 | A1 | 1/2004 | Bibl et al. | |
| 2004/0085416 | A1 | 5/2004 | Kent | |
| 2007/0091150 | A1 | 4/2007 | Kodama | |
| 2007/0291082 | A1 | 12/2007 | Baumer et al. | |
| 2008/0068425 | A1 * | 3/2008 | Nathan ................ | B41J 2/14233 347/68 |
| 2008/0238980 | A1 | 10/2008 | Nagashima et al. | |

(Continued)

FOREIGN PATENT DOCUMENTS

| | | | | |
|---|---|---|---|---|
| CN | 101541543 A * | 9/2009 | .......... | B41J 2/14233 |
| CN | 101734013 | 6/2010 | | |

(Continued)

OTHER PUBLICATIONS

International Search Report and Written Opinion in International Appln. No. PCT/US2022/049981, mailed on Feb. 21, 2023, 18 pages.

*Primary Examiner* — Sharon Polk
(74) *Attorney, Agent, or Firm* — Fish & Richardson P.C.

(57) ABSTRACT

A method for ejecting fluid from a fluid ejector includes actuating a piezoelectric actuator to cause deformation of a membrane defining a wall at a first end of an elongated channel of the fluid ejector, the deformation of the membrane causing ejection of a droplet of fluid from a nozzle disposed at a second end of the channel. The elongated channel fluidically connects a first channel to the nozzle, the first channel disposed at the first end of the elongated channel, and wherein an impedance of the first channel is at least ten times greater than an impedance of the elongated channel. Deformation of the membrane induces fluid flow along the elongated channel, and wherein at least 60% of the fluid flow induced by the deformation of the membrane is in a direction extending from the first end of the elongated channel to the second end of the elongated channel.

29 Claims, 7 Drawing Sheets

(56) References Cited

U.S. PATENT DOCUMENTS

| | | | |
|---|---|---|---|
| 2009/0225135 | A1 | 9/2009 | Suzuki |
| 2010/0225706 | A1 | 9/2010 | Yamamoto |
| 2010/0233363 | A1 | 9/2010 | Uchiyama |
| 2012/0160925 | A1 | 6/2012 | Hoisington et al. |
| 2013/0033536 | A1 | 2/2013 | Sawase |
| 2014/0292954 | A1 | 10/2014 | Hirabayashi et al. |
| 2017/0120602 | A1 | 5/2017 | Nakai et al. |
| 2017/0253037 | A1 | 9/2017 | Kobayashi |
| 2018/0201022 | A1 | 7/2018 | Menzel et al. |
| 2018/0281409 | A1* | 10/2018 | Sugai ....................... B41J 2/045 |
| 2019/0077144 | A1 | 3/2019 | Nakatani et al. |
| 2020/0331262 | A1 | 10/2020 | Andou et al. |

FOREIGN PATENT DOCUMENTS

| | | |
|---|---|---|
| CN | 101804727 | 8/2010 |
| CN | 102481789 | 5/2012 |
| JP | 2008142910 | 6/2008 |
| WO | WO 2016031920 | 3/2016 |
| WO | WO 2017149330 | 9/2017 |

* cited by examiner

EFFICIENT INK JET PRINTING

CLAIM OF PRIORITY

This application claims priority to U.S. Patent Application Ser. No. 63/279,795, filed on Nov. 16, 2021, the contents of which is incorporated herein by reference in its entirety.

BACKGROUND

Ink jet printing can be performed using an ink jet print head that includes multiple nozzles. Ink is introduced into the ink jet printhead and, when activated, the nozzles eject droplets of ink to form an image on a substrate. The printhead can include fluid delivery systems with actuators that operate to eject fluid from a pumping chamber of the printhead. Actuation of an actuator causes deformation of a membrane that changes a volume of a pumping chamber, which in turn causes fluid to be ejected from the fluid delivery system.

SUMMARY

We describe here a high efficiency fluid ejector and an approach to energy efficient ejection of fluid, such as ink, from a fluid ejector. The fluid ejectors described here have a single, vertical channel of uniform width and impedance, which reduces or eliminates impedance mismatch and fluid resistance along the fluid flow pathway through the fluid ejector. In addition, the geometry of the fluid ejectors described here gives the fluid ejectors a low impedance and high resonance frequency, which contributes to high energy efficiency in operation. The fluid ejectors described here also have large differences in impedance between the single channel in the fluid ejectors and the flow pathways into and out of the fluid ejectors, which reduces or eliminates leakage of energy out of the fluid ejectors.

In an aspect, a method for ejecting fluid from a fluid ejector includes actuating a piezoelectric actuator to cause deformation of a membrane defining a wall at a first end of an elongated channel of the fluid ejector, the deformation of the membrane causing ejection of a droplet of fluid from a nozzle disposed at a second end of the channel. The elongated channel fluidically connects a first channel to the nozzle, the first channel disposed at the first end of the elongated channel, and wherein an impedance of the first channel is at least ten times greater than an impedance of the elongated channel. Deformation of the membrane induces fluid flow along the elongated channel, and wherein at least 60% of the fluid flow induced by the deformation of the membrane is in a direction extending from the first end of the elongated channel to the second end of the elongated channel.

Embodiments can include one or any combination of two or more of the following features.

At least 80% or at least 90% of the fluid flow induced by the actuation is in the direction extending from the first end of the elongated channel to the second end of the elongated channel.

The impedance of the first channel is at least twenty times greater or at least fifty times greater than the impedance of the elongated channel.

The method includes ejecting a droplet of fluid from the nozzle responsive to actuation of the piezoelectric actuator. The method includes flowing fluid that is not ejected from the nozzle into a second channel disposed at the second end of the elongated channel. An impedance of the second channel is at least ten times greater than an impedance of the elongated channel. The method includes, after ejection of a droplet from the nozzle, drawing fluid into the elongated channel from the first channel, second channel, or both.

The elongated channel has a uniform width along the length of the elongated channel.

The elongated channel has a uniform impedance along the length of the elongated channel.

A cross sectional area of the inlet channel is less than a cross sectional area of the elongated channel.

The extent of a clear area of the membrane is greater than or equal to a width of the elongated channel. For instance, the extent of the clear area of the membrane is between 0 and 30% greater than the width of the elongated channel.

In an aspect, a fluid ejection apparatus includes a first channel; a nozzle; an elongated channel fluidically connecting the first channel to the nozzle, wherein the first channel is disposed at the first end of the elongated channel and the nozzle is disposed at the second end of the elongated channel; and an actuator. The actuator includes a membrane defining a wall at a first end of the elongated channel; and a piezoelectric element positioned to apply an actuation force to fluid in the elongated channel, the membrane being disposed between the piezoelectric element and an interior of the elongated channel. An impedance of the first channel is at least ten times greater than an impedance of the elongated channel. During operation of the fluid ejection apparatus, deformation of the membrane induces fluid flow along the elongated channel such that at least 60% of the fluid flow induced by the deformation of the membrane is in a direction extending from the first end of the elongated channel to the second end of the elongated channel.

Embodiments can include one or any combination of two or more of the following features.

The impedance of the inlet channel is at least twenty times greater or at least fifty times greater than the impedance of the elongated channel.

A width of the elongated channel is substantially uniform along the entire length of the elongated channel.

The fluid ejection apparatus includes a second channel disposed at the second end of the elongated channel. An impedance of the second channel is at least ten times greater than the impedance of the elongated channel.

The piezoelectric actuator is centered about an axis of the elongated channel.

The membrane has a thickness of between 0.1 μm and 20 μm, e.g., between 2 μm and 8 μm.

The membrane extends across an entire width of the elongated channel.

A cross sectional area of the inlet channel is less than a cross sectional area of the elongated channel.

The extent of a clear area of the membrane is greater than or equal to a width of the elongated channel. For instance, the extent of the clear area of the membrane is between 0 and 30% greater than the width of the elongated channel.

In an aspect, a printhead includes an array of fluid ejectors according to the previous aspect.

The array can include a parallelogram shaped array of fluid ejectors.

The details of one or more implementations are set forth in the accompanying drawings and the description below. Other features and advantages will be apparent from the description and drawings, and from the claims.

DETAILED DESCRIPTION

We describe here a high efficiency fluid ejector and an approach to energy efficient ejection of fluid, such as ink, from a fluid ejector. The fluid ejectors described here have a single channel of uniform width and impedance, which reduces or eliminates impedance mismatch and fluid resistance along the fluid flow pathway through the fluid ejector. In addition, the geometry of the fluid ejectors described here gives the fluid ejectors a low impedance and high resonance frequency, which contributes to high energy efficiency in operation. The fluid ejectors described here also have large differences in impedance between the single channel in the fluid ejectors and the one or more flow pathways into and out of the fluid ejectors, which reduces or eliminates leakage of energy out of the fluid ejectors.

Figure 1:
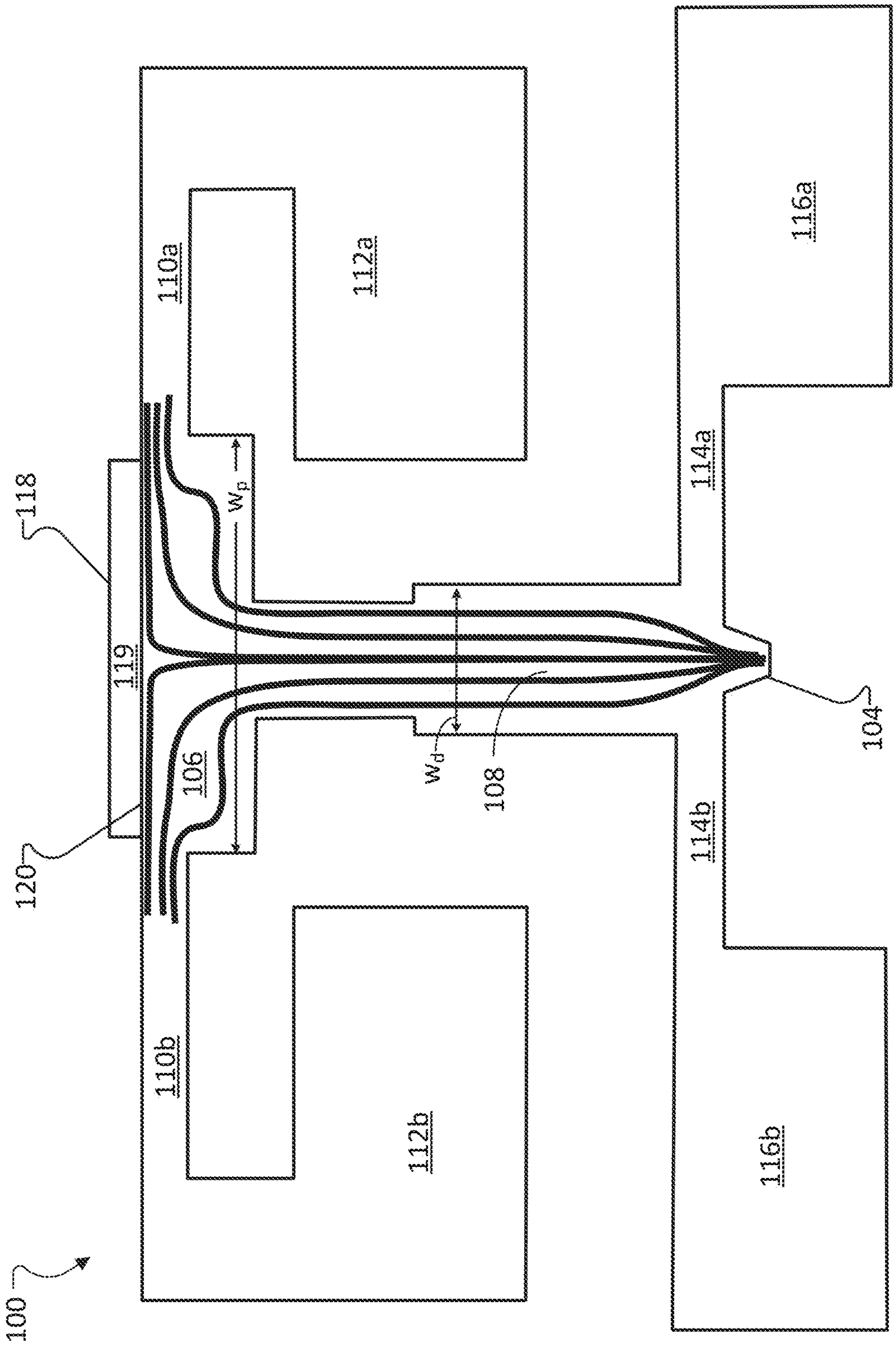
FIG. 1 is a diagram of a fluid ejector.

Referring to FIG. 1, a fluid ejector 100 of an ink jet printer includes fluid flow pathways formed in a substrate through which fluid can flow and be ejected from a nozzle 104 of the fluid ejector. The nozzle 104 is fluidically connected to a pumping chamber 106 via a descender 108. The width $w_d$ of the descender 108 is less than the width $w_p$ of the pumping chamber 106. The descender 108 is shown as having regions of different width; in some examples, the descender has uniform width along the entire length of the descender. One or more channels 110*a*, 110*b* fluidically connect the fluid ejector 100 to corresponding manifolds 112*a*, 112*b* (collectively referred to as channels 110 and manifolds 112). At the nozzle end of the descender 108, one or more channels 114*a*, 114*b* fluidically connect the fluid ejector 100 to corresponding manifolds 116*a*, 116*b* (collectively referred to as channels 114 and manifolds 116). Each manifold 112, 116 is connected to multiple fluid ejectors 100. Although a total of four channels 110, 114 are shown in FIG. 1, the fluid ejector can be supplied with fluid through fewer than four or more than four channels.

The fluid ejector 100 includes an actuator 118, such as a piezoelectric actuator. The actuator 118 includes a piezoelectric element 119 and a deformable membrane 120, such as a silicon membrane. The piezoelectric element 119 is separated from the pumping chamber 106 by the deformable membrane 120 such that the membrane 120 defines at least a portion of a top wall of the pumping chamber. The membrane 120 isolates the piezoelectric element 119 of the actuator 118 from fluid in the pumping chamber 106. The membrane 120 can be a unitary part of the substrate 102 or can be formed of a material different from the substrate. In operation, the piezoelectric element 119 contracts parallel to the motion of the actuator 118, and the membrane 120 works against the piezoelectric element 119, causing the actuator 118 to bend.

To eject a droplet of fluid from the nozzle 104, the actuator 118 is actuated, applying an actuation pulse to fluid in the pumping chamber 106. The actuator 118 is operated according to the resonance frequency of the fluid ejector 100. The applied actuation pulse causes the drop to eject from the nozzle 104. Specifically, deformation of the membrane 120 of the actuator 118 caused by a rising edge of the applied waveform increases the volume of the pumping chamber and this, in turn, causes the propagation of a low pressure wave along the elongated channel 108. When the low pressure wave reaches the nozzle 104, the meniscus of fluid at the nozzle 104 is pulled back. A high pressure wave, generated by from the falling edge of the applied waveform returning the pumping chamber is then propagated along the elongated channel 108, timed such that the returning fluid flow from the negative pressure wave hits the meniscus with the high pressure wave, causing ejection of a droplet of fluid from the nozzle 104.

Fluid flow in the pumping chamber 106 responsive to actuation of the actuator 118 is perpendicular to the direction of actuation of the actuator: actuation of the actuator 118 induces fluid flow both horizontally along the pumping chamber 106 and vertically down the descender 108, as shown by the flow lines in FIG. 1.

Following fluid ejection from the nozzle 104, the fluid ejector 100 is refilled by fluid drawn into the pumping chamber 106 and descender 108 from some or all of the channels 110, 114. The fluid flow pathways through which ejector refill flow is provided is based on factors such as the impedance of each channel and the cumulative inductance from the nozzle 104 to the manifolds 112, 116 along the respective pathways. In some examples, the fluid ejector 100 also implements a recirculation flow, in which fluid flows into the fluid ejector through the channels 110 and out of the fluid ejector through the channels 114.

In some examples, the actuator 118 is a piezoelectric actuator including drive and ground electrodes, with a piezoelectric layer positioned between the two electrodes. The drive electrode and the ground electrode are formed from a conductive material (e.g., a metal or conductive ceramic), such as copper, gold, tungsten, titanium, platinum, iridium, indium-tin-oxide (ITO), or a combination of conductive materials. The thickness of the drive and ground electrodes is e.g., about 2 μm or less, about 1 μm, about 0.5 μm, about 0.25 μm, etc. To actuate the actuator 118, an electrical voltage is applied between the electrodes, causing a difference across the piezoelectric layer positioned therebetween. Alternatively, an electric field is applied directly to the piezoelectric layer. The voltage or applied electric field induces a polarity on the piezoelectric layer that causes the piezoelectric layer to shrink, generating a stress force that in turn generates a moment, driving bending of the membrane 120. The deflection of the membrane 120 causes a change in volume of the pumping chamber 106, producing a pressure pulse in the pumping chamber 106 that results in ejection of fluid from the nozzle 104.

Figure 2:
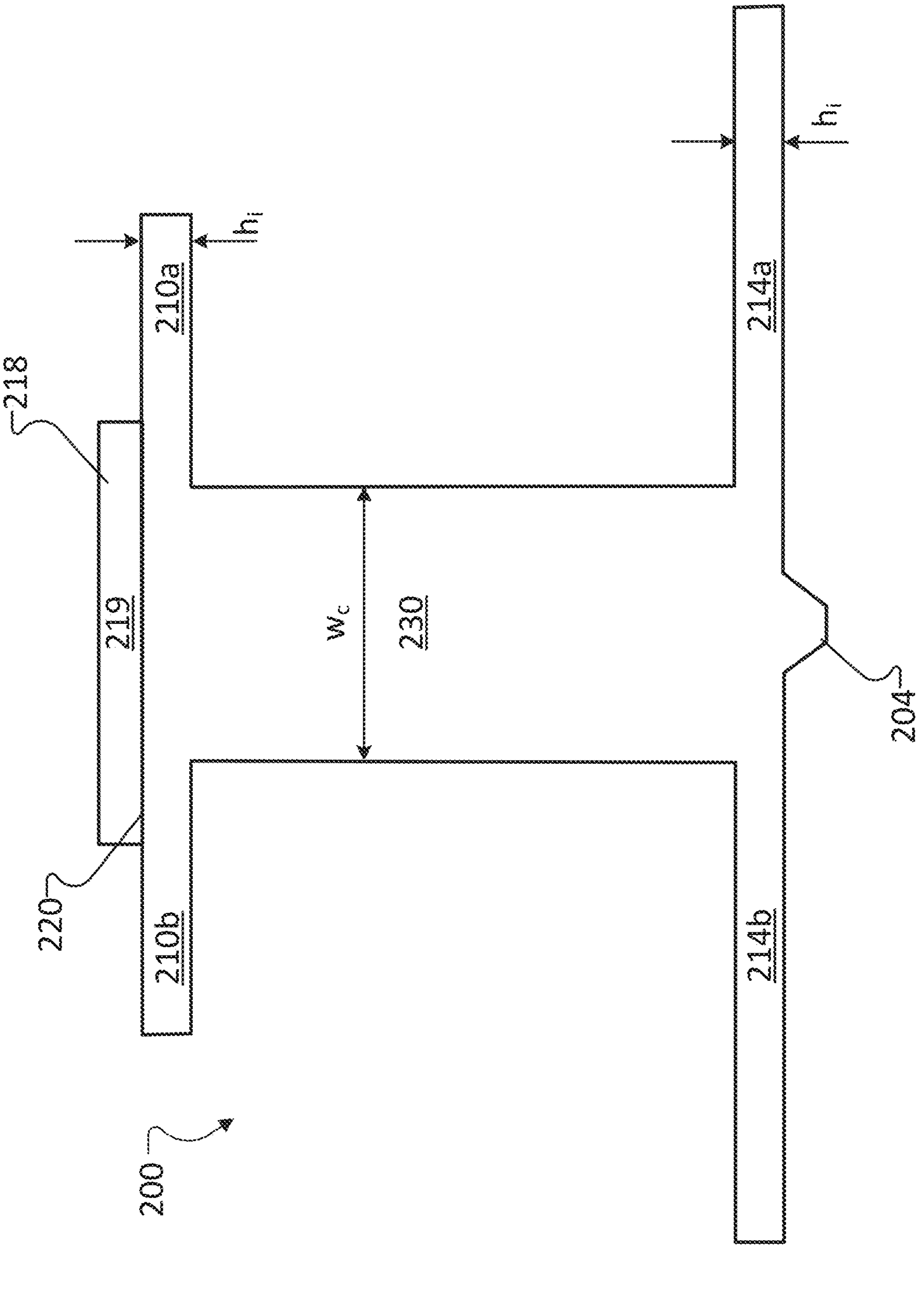
FIG. 2 is a diagram of a high efficiency fluid ejector.
Figure 3:
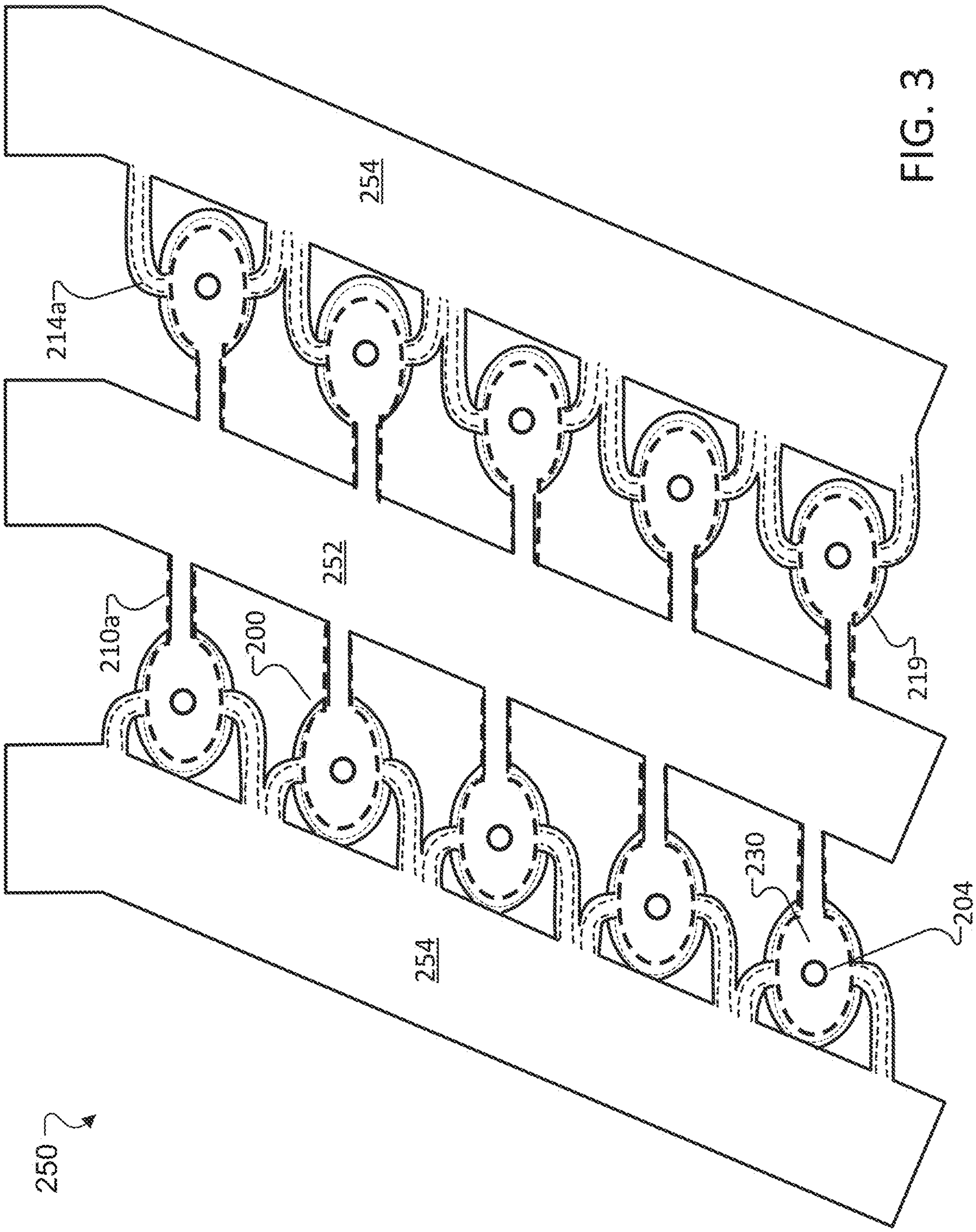
FIG. 3 is a diagram of an array of fluid ejectors.

Referring to FIGS. 2 and 3, a high efficiency fluid ejector 200 has a configuration that mitigates at least some sources of energy loss, allowing the fluid ejector 200 to operate with high efficiency. FIG. 2 shows a side view of a single fluid ejector 200, and FIG. 3 shows a top perspective view of a parallelogram-shaped array 250 of such fluid ejectors 200.

In operation, fluid flows through fluid flow pathways of the fluid ejector 200 and is ejected from a nozzle 204 of the fluid ejector. Channels 210*a*, 210*b* (collectively channels 210) are horizontally oriented and supply fluid to the fluid ejector 200 from corresponding manifolds 252 (FIG. 3), each of which is connected to multiple fluid ejectors 200. The channels 210 are fluidically connected to the nozzle 204 by a vertically oriented, elongated channel 230, with the channels 210 meeting the elongated channel 230 at a first end of the channel and the nozzle 204 being disposed at a second end of the channel. The channels 210 are perpendicular to the elongated channel 230.

The width $w_c$ of the elongated channel 230 is substantially constant along the entire length of the elongated channel 230 (sometimes referred to as "uniform width"). A channel that has a substantially constant width may have a slight variation in width along its length, e.g., due to manufacturing considerations. For example, a channel with substantially constant width can have a width that varies by less than 10%, less than 5%, less than 2%, or less than 1% along its length. The nozzle 204 is centered relative to the elongated channel 230. At the nozzle end of the elongated channel 230, channels 214*a*, 214*b* (collectively channels 214) fluidically connect the fluid ejector 200 to corresponding manifolds 254 (FIG. 3), each of which is connected to multiple fluid ejectors 200. The channels 214 are oriented horizontally and are perpendicular to the elongated channel 230.

The fluid ejector 200 includes an actuator 218, such as a piezoelectric actuator, e.g., as described above for the actuator 118. The actuator 218 includes a piezoelectric element 219 and a deformable membrane 220, such as a silicon membrane. The piezoelectric element 219 is separated from the elongated channel 230 by the deformable membrane 220 such that the membrane 220 defines at least a portion of a wall at the first end of the elongated channel 230, isolating the piezoelectric element 219 of the actuator 218 from the fluid in the elongated channel 230.

The relative sizes of the actuator 218 and the elongated channel 230 are selected such that fluid flow through the channel 230 is substantially in the same direction as the displacement of the actuator 218 (e.g., in a direction directly toward the nozzle and perpendicular to the plane of the actuator 218). For instance, the width $w_m$ of the actuator 218 is equal to or greater than the width $w_c$ of the elongated channel 230. The sizing of the actuator 218 and elongated channel 230 are discussed further with respect to FIGS. 4A and 4B.

To eject a droplet of fluid from the nozzle 204, the actuator 218 is actuated, applying an actuation pulse to fluid in the elongated channel 230. The applied actuation pulse causes fluid to flow down the elongated channel 230 and out the nozzle 204, e.g., due to propagation of pressure waves as described above for FIG. 1. Following fluid ejection from the nozzle 204, the fluid ejector 200 is refilled by fluid drawn into the elongated channel 230 from the some or all of the channels 210, 214, e.g., depending on the impedance and inductance of each flow pathway. The fluid ejector 200 can also implement a recirculation flow, in which fluid flows into the fluid ejector through the channels 210 and out of the fluid ejector through the channels 214.

The configuration of the high efficiency fluid ejector 200 reduces energy loss in the fluid ejector 200, allowing more of the energy generated by deflection of the actuator 218 to contribute to ejection of a droplet from the nozzle 204. For instance, as discussed in the following paragraphs, energy loss can be reduced by one or more of the following: reducing or eliminating impedance mismatch along the fluid flow pathway through the fluid ejector, reducing inductance of the fluid ejector, reducing resistance along the fluid flow channels, or reducing or eliminating leakage of energy into fluidic connections to the fluid ejector 200, e.g., the inlet channels, recirculation channels, or both.

In the high efficiency fluid actuator 200, the presence of the elongated channel 230 enables fluid flow in the elongated channel 230 responsive to actuation of the actuator 218 to parallel to the direction of deformation of the membrane. Fluid is drawn into the elongated channel 230 from some or all of the channels 210, 214. Upon actuation of the actuator 218, the membrane 220 deforms in the vertical direction, as shown by an arrow 250. The deformation of the membrane 220 induces fluid flow vertically down the elongated channel 230 from the first end to the second end of the elongated channel 230, toward the nozzle 204, as shown by an arrow 252. The extent of the clear area of the actuator 218 relative to the width of the elongated channel 230 contributes to the amount of vertical and horizontal flow in the fluid ejector 200. For instance, at least 60%, at least 70%, at least 80%, at least 90%, or at least 95% of the fluid flow that is induced by actuation of the actuator 218 is in the direction extending from the first end to the second end of the elongated channel 230. That the direction of fluid flow and the direction of membrane deformation are harmonized facilitates energy efficient operation of the fluid ejector 200.

That the fluid flow pathway through the fluid ejector 200 includes only a single elongated channel 230 of uniform width connecting the inlet channels 210*a*, 210*b* to the nozzle 204 (e.g., rather than both a pumping chamber and a distinct descender) means that there is no change in impedance as the fluid flows through the fluid ejector 200. This constant impedance also contributes to the high efficiency operation of the fluid ejector 200. The constant impedance of the fluid flow pathway within the fluid ejector 200 (e.g., the constant impedance of the elongated channel 230) prevents reflection of energy at an interface with mismatched impedance, thereby allowing a larger portion of the energy generated by the actuator 218 to arrive at the nozzle 204. By contrast, in some fluid ejectors, energy can be reflected due to an impedance mismatch at an interface between a pumping chamber and a descender (e.g., between the pumping chamber 106 and the descender 108 of the fluid ejector 100 of FIG. 1), reducing the amount of energy supplied by the actuator that arrives at the nozzle.

In addition, the lack of a shallow pumping chamber with horizontal flow in the fluid ejector 200 reduces the inertance I of the fluid ejector as compared to an ejector with such a pumping chamber (e.g., the fluid ejector 100 with pumping chamber 106). The inertance, which is proportional to the length of the channel over its cross sectional area, is further reduced because of the large cross-sectional area (perpendicular to the direction of fluid flow) of the elongated channel 230. This reduction in inertance in turn increases the resonant frequency of the fluid ejector 200. The resonant frequency $f_{nat}$ of a fluid ejector is given by the following equation; it can be seen that a reduction of inertance enables the actuator to becauses an increase in resonant frequency:

$$f_{resonance} = \frac{1}{2\pi} * \frac{1}{\sqrt{C*I}},$$

where C is the compliance of the actuator and I is the fluidic inertance of the fluid ejector. For a fluid ejector with a smaller I, C can be bigger (e.g., the actuator can be softer) while still achieving a desired resonant frequency. Because a softer actuator requires a smaller voltage to achieve the appropriate deflection volume for a target drop size, the decrease in fluidic inertance allows an increase in actuator compliance thereby leading to a more efficient jet (e.g., the ratio of energy out to energy in) operating at a given target resonance frequency. The energy out of the fluid ejector (given as $\frac{1}{2}mv^2$) remains the same regardless of resonant frequency. However, for the same ink and same sized actuator, the energy in (given as $\frac{1}{2}cV^2$, where c is the capacitance and V is the voltage) is lower, because the voltage can be lower given the higher resonant frequency.

The presence of a single elongated channel 230 also enables high efficiency operation in that the fluid flow pathway through the fluid ejector 200 is deep in the direction of fluid flow, thus presenting low resistance to the flow of fluid through the fluid ejector 200. With low resistance in the fluid flow pathway through the fluid ejector 200, little of the energy supplied by the actuator 218 is lost. By contrast, in some fluid ejectors, the presence of a shallow pumping chamber (e.g., the pumping chamber 106 of the fluid ejector 100 of FIG. 1) generates resistance to fluid flow, thus absorbing some of the energy generated by the actuator and causing less of the generated energy to contribute to fluid flow to the nozzle.

The elongated channel 230 presents a low resistance to the fluid flowing through the fluid ejector 200, also contributing to the energy efficiency of the ejector. As fluid flows along a channel, viscous loss occurs due to the interaction between the fluid and the walls of the channel, causing a loss of energy. As a channel is made wider, the resistance presented by the walls of the channel decreases, but the volume of the channel increases, which also absorbs energy. The size (e.g., width, height, or both) of the elongated channel 230 is balanced to reduce channel volume while also reducing the surface area of the walls of the channel, thereby reducing the amount of energy absorbed by fluid flow through the elongated channel 230. The balance between resistive energy loss and volume energy absorption changes with both cross-sectional area of the elongated channel 230 and length of the elongated channel 230. For instance, the width of the elongated channel can be between 100 μm and 300 μm and the length of the elongated channel can be between 300 μm and 1000 μm.

The relative sizes of the inlet channels 210*a*, 210*b*, recirculation channels 214*a*, 214*b*, and the elongated channel 230 contribute to the performance of the fluid ejector 200. The ratio of cross sectional areas contributes to the amount of energy lost out the inlet channels 210*a*, 210*b* and recirculation channels 214*a*, 214*b*. The inertance of the inlet channels 210*a*, 210*b* and recirculation channels 214*a*, 214*b*, which is proportional to the length of the channel divided by its cross sectional area, contributes to the speed with which the fluid ejector 200 can be refilled after jetting.

In the fluid ejector 200, the height $h_i$ and depth (into the page of the figure; not shown) of the inlet channels 210*a*, 210*b* is significantly smaller than the width $w_c$ of the elongated channel 230. Thus, the inlet channels 210*a*, 210*b* have a cross sectional area (in the plane defined by their height and depth) that is small. Combined with their length, that small cross sectional area gives the inlet channels 210*a*, 210*b* a high inertance. In addition, the cross sectional area of the inlet channels 210*a*, 210*b* is significantly smaller than the cross sectional area of the elongated channel 230 (in the plane defined by its width and depth), meaning that the impedance of the inlet channels 210*a*, 210*b* is significantly greater than the impedance at the jet resonant frequency of the elongated channel 230, e.g., at least ten times greater, at least 20 times greater, or at least 50 times greater. Similarly, the height $h_r$, and depth of the recirculation channels 214*a*, 214*b* is significantly smaller than the width $w_c$ of the elongated channel 230. This means that the recirculation channels 214*a*, 214*b* have a high inertance and resistance, and that the impedance of the recirculation channels 214*a*, 214*b* is significantly greater than the impedance of the elongated channel 230 and nozzle at the jet resonant frequency, e.g., at least ten times greater, at least 20 times greater, or at least 50 times greater.

The small cross sectional area of the inlet channels 210*a*, 210*b* and recirculation channels 214*a*, 214*b* compared to the cross sectional area of the elongated channel 230, and the resulting large difference in impedance between the inlet or recirculation channels and the elongated channel 230, contributes to the energy efficient operation of the fluid ejector 200. The narrow inlet and recirculation channels prevent significant leakage of energy and fluid out of the fluid ejector 200, such that substantially all of the fluid in the fluid ejector flows down the elongated channel 230 and toward the nozzle 204. Furthermore, the high impedance of the inlet channels 210*a*, 210*b* and recirculation channels 214*a*, 214*b* means that energy propagating in the elongated channel 230 is not lost into the inlet and recirculation channels, but rather stays in the elongated channel 230, further facilitating high efficiency operation.

Figure 4B:
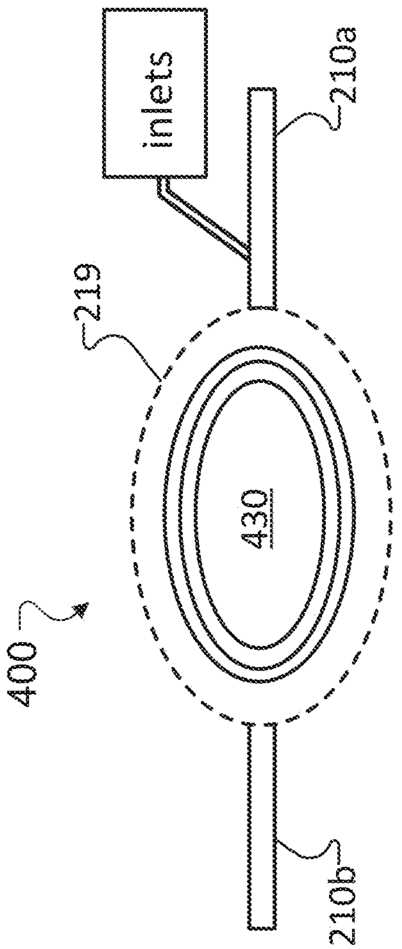
FIGS. 4A and 4B are side view and top view diagrams of a high efficiency fluid ejector.
Figure 4A:
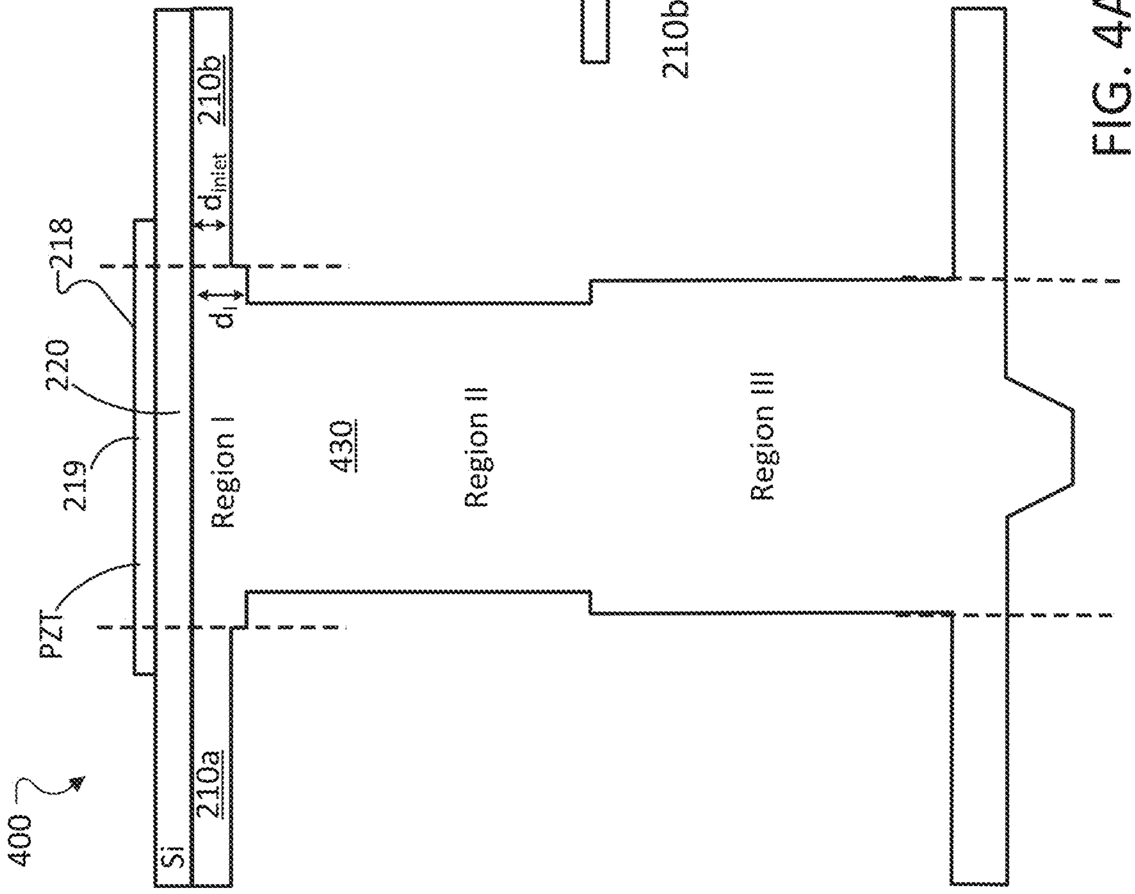

FIGS. 4A and 4B shows a portion of a fluid ejector 400 in side view and top view to illustrate the relationship between the extent of the clear area of the actuator 218 and the width of an elongated channel 430 having a uniform width. In the example of FIG. 4A, the uniform width elongated channel 430 has regions II and III of slightly different width, e.g., arising from processing considerations. The extent of the actuator is marked as Region I. The clear area of the actuator 218 is the region of the actuator 218 that is not directly bonded to the substrate of the fluid ejector.

The extent of the actuator 218 is slightly greater than the width of the elongated channel 430 (e.g., the width of Region II), facilitating substantially vertical flow through the elongated channel 430. In some examples, the extent of the actuator 218 is equal to the width of the elongated channel 430 (e.g., the width of Region II). Generally, the clear area of the actuator 218 is less than 30% greater than the width of the elongated channel, e.g., less than 25% greater, less than 20% greater, less than 10% greater, less than 5% greater, or less than 1% greater.

In the example of FIG. 4A, the cross sectional area of the elongated channel 430 (e.g., of the Region II area of the elongated channel 430) is significantly greater than the cross sectional area of inlet channels 410*a*, 410*b*. This configuration also facilitates vertical flow through the elongated channel 430 and helps to reduce the reflection of energy into the inlet channels 410*a*, 410*b*.

Referring again to FIG. 2, as discussed above, the reduced inertance of the fluid ejector 200 enables the compliance of the actuator 218 to be increased as compared to, e.g., the compliance of the actuator 118 of the fluid ejector 100 for a given resonance frequency. For instance, the membrane 220 of the actuator 218 can be thinner, and thus less stiff than, the membrane of the actuator 118 of the fluid ejector 100. For instance, the membrane 220 can have a thickness of less than about 20 μm e.g., between 0.11 μm and 20 between 1 μm and 10 μm, or between 5 μm and 8 μm. In some examples, a thin, rigid membrane can be used in conjunction with an elongated channel with a small cross sectional area.

The fluid ejector 200 is capable of operating effectively at lower voltages than standard fluid ejectors of comparable size, e.g., running at comparable jetting frequencies and drop velocities but with a lower voltage than standard fluid ejectors. For instance, the fluid ejector 200 can operate with a drop velocity of about 4-10 m/s, e.g., about 6-8 m/s at a voltage that is lower than that of standard fluid ejectors. Moreover, the fluid ejector 200 is capable of operating at jetting speeds (e.g., frequencies) that are consistent with those of comparably sized standard fluid ejectors, indicating that high efficiency operation can be obtained without sacrificing speed. For instance, the fluid ejector 200 can perform at jetting frequencies of up to, e.g., 100 kHz, and with a pulse width of between 1.5 μs and 2.5 μs, e.g., between 1.8 μs and 2.1 μs, e.g., enabling a printing line speed of up to 2 m/s. Alternatively, the fluid ejector 200 can be smaller than a standard fluid ejector for a given set of operating parameters (e.g., voltage, drop velocity, and frequency).

Figure 5:
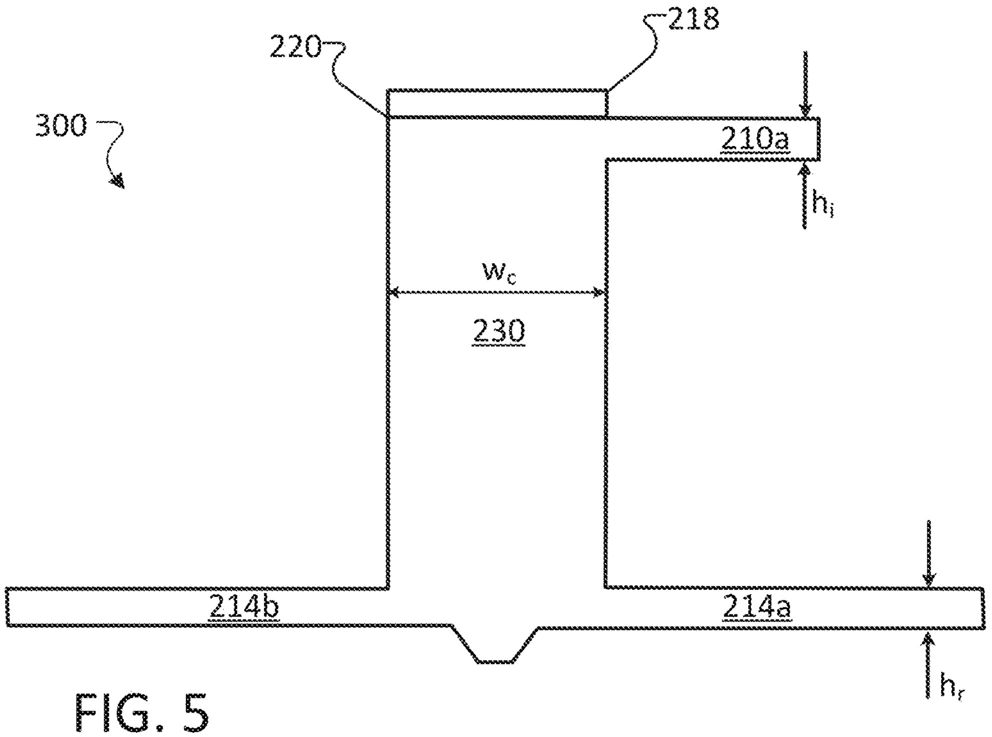
FIGS. 5-7 are diagrams of high efficiency fluid ejectors.
Figure 6:
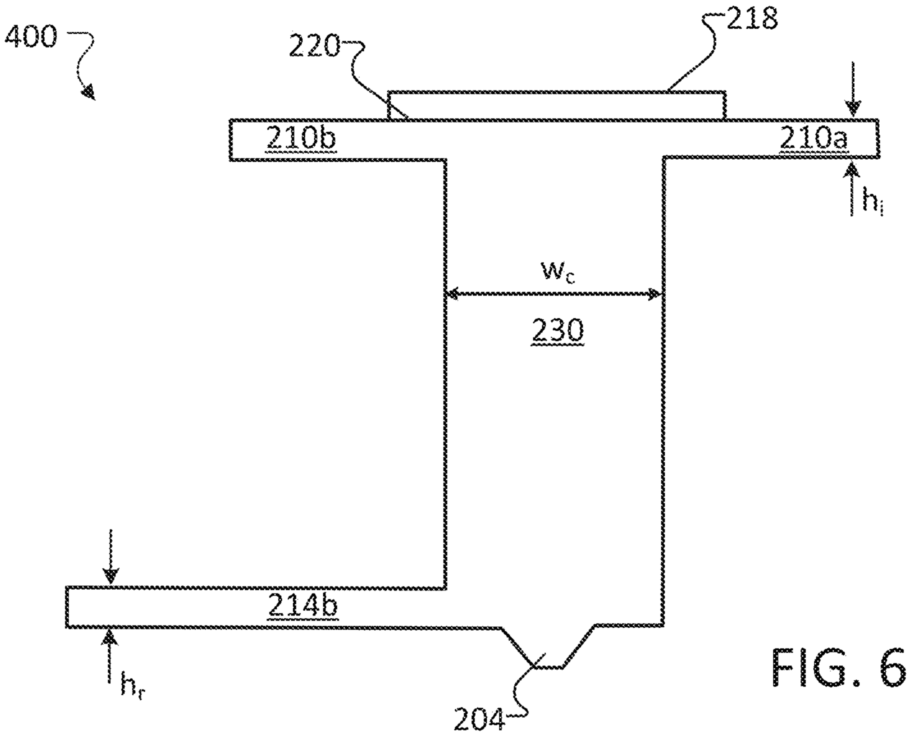
Figure 7:
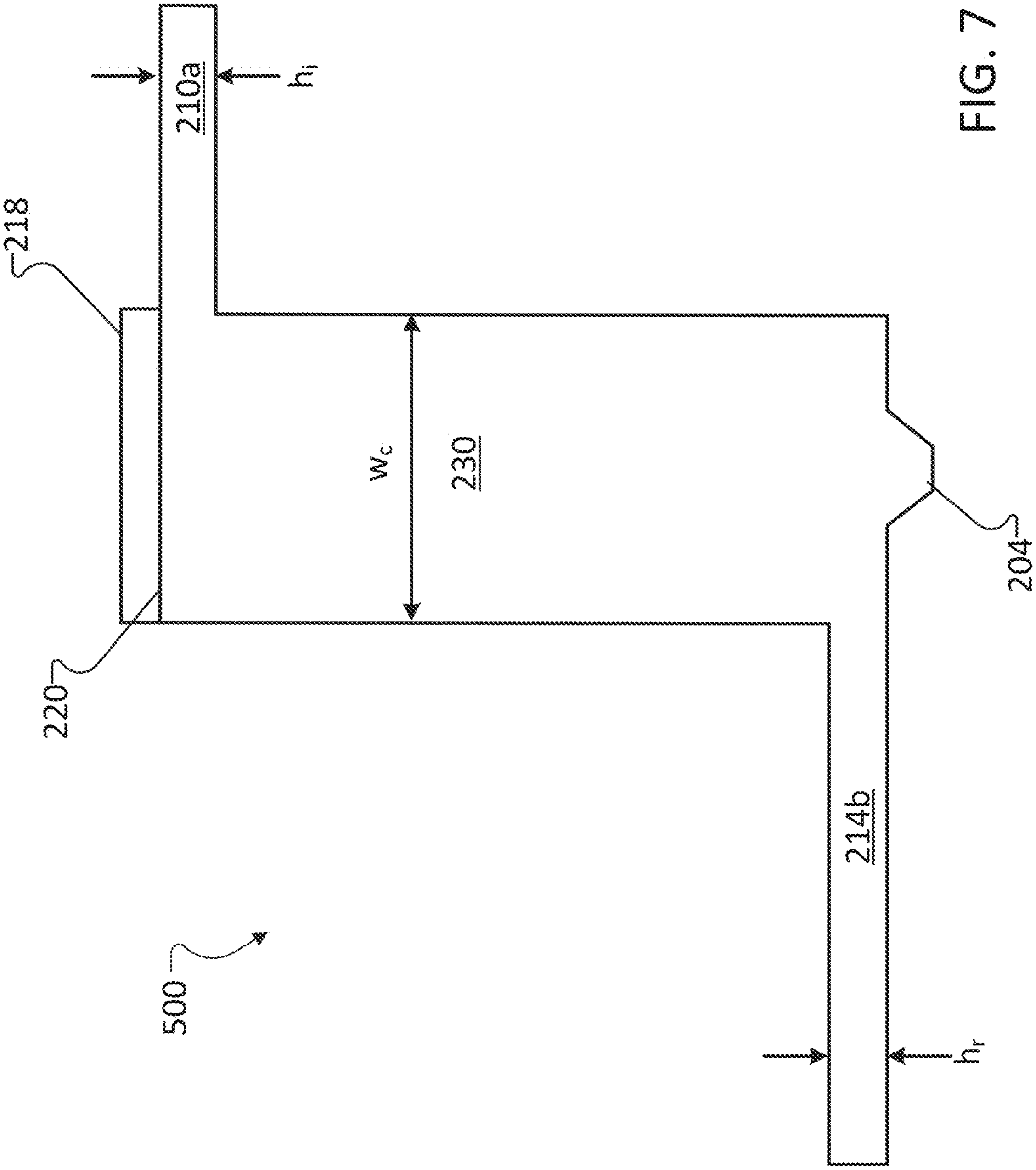

FIGS. 5-7 show examples of alternative or additional configurations for high efficiency fluid ejectors. In general, a high efficiency fluid ejector has a single elongated channel of uniform width that provides a fluid flow pathway of low resistance and constant impedance to the nozzle of the fluid ejector. A high efficiency fluid ejector can have one or more inlet channels, one or more recirculation channels, or both that are narrow compared to the elongated channel, thereby presenting a high impedance that helps prevent leakage of energy out of the fluid ejector.

Referring to FIG. 5, a high efficiency fluid ejector 300 includes only a single inlet channel 210*a* fluidically connected to the nozzle 204 by the elongated channel 230. At the nozzle end of the elongated channel 230, the recirculation channels 214*a*, 214*b* fluidically connect the fluid ejector 300 to corresponding return manifolds. The actuator 218 is separated from the elongated channel 230 by the deformable membrane 220 such that the membrane 220 defines at least a portion of a top wall of the elongated channel 230, isolating the actuator 218 from the fluid in the elongated channel 230. The height and width characteristics of the inlet channel 210*a*, recirculation channels 214*a*, 214*b*, and elongated channel 230 are as described above for the fluid ejector 200.

Referring to FIG. 6, a high efficiency fluid ejector 400 includes two inlet channels 210*a*, 210*b* fluidically connected to the nozzle 204 by the elongated channel 230. At the nozzle end of the elongated channel 230, a single recirculation channel 214*b* fluidically connects the fluid ejector 400 to corresponding return manifolds. The actuator 218 is separated from the elongated channel 230 by the deformable membrane 220 such that the membrane 220 defines at least a portion of a top wall of the elongated channel 230, isolating the actuator 218 from the fluid in the elongated channel 230. The height and width characteristics of the inlet channels 210*a*, 210*b*, recirculation channel 214*b*, and elongated channel 230 are as described above for the fluid ejector 200.

Referring to FIG. 7, a high efficiency fluid ejector 500 includes a single inlet channel 210*a* and a single recirculation channel 214*b*. The actuator 218 is separated from the elongated channel 230 by the deformable membrane 220 such that the membrane 220 defines at least a portion of a top wall of the elongated channel 230, isolating the actuator 218 from the fluid in the elongated channel 230. The height and width characteristics of the inlet channel 210*a*, recirculation channel 214*b*, and elongated channel 230 are as described above for the fluid ejector 200.

Figure 8:
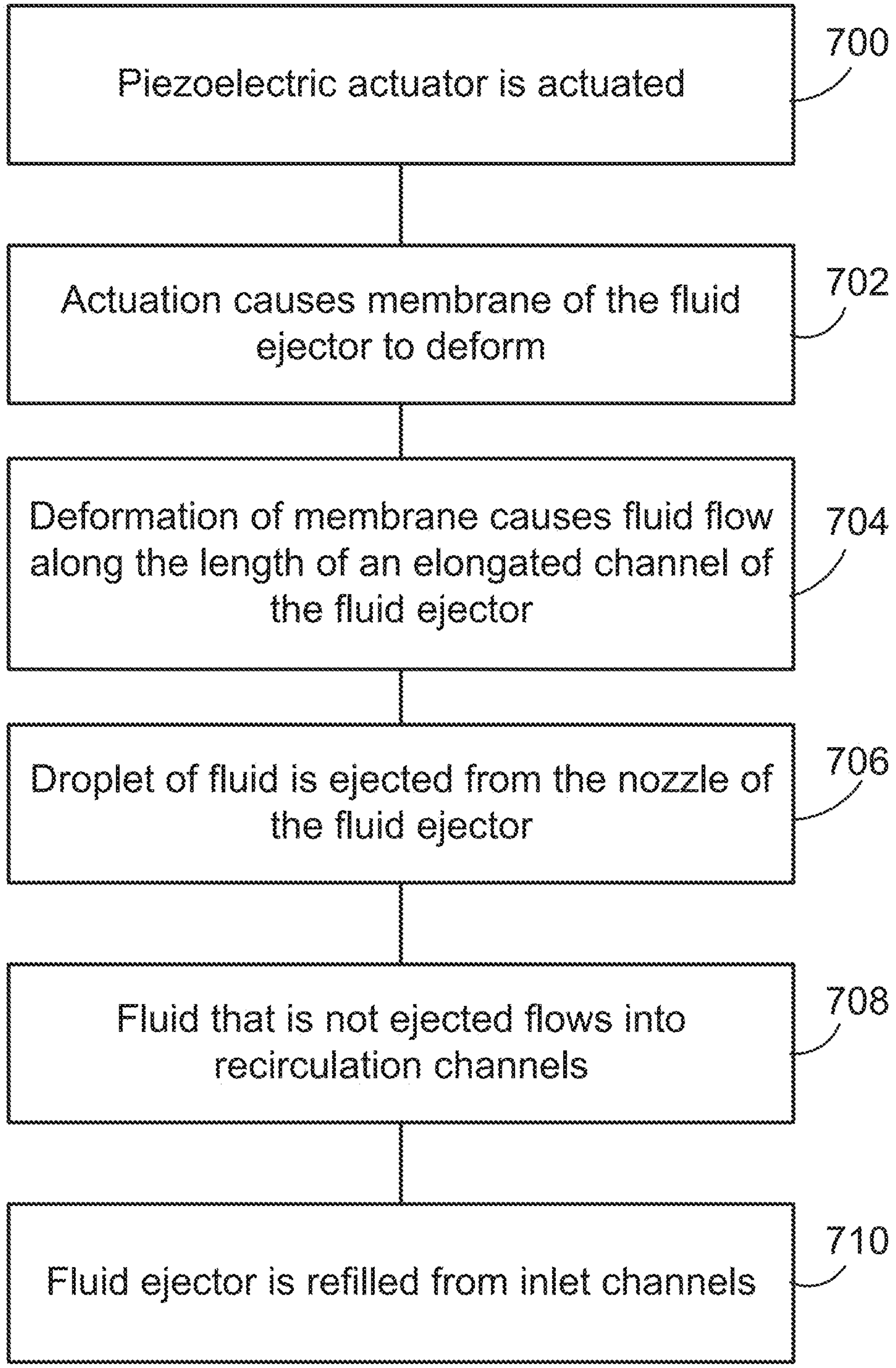
FIG. 8 is a flow chart.

Referring to FIG. 8, in operation of a high efficiency fluid ejector, an actuator, such as a piezoelectric actuator, is actuated (700), causing a membrane of the fluid ejector to deform (702). The membrane defines a wall at a first end of an elongated channel of the fluid ejector. The deformation of the membrane induces fluid flow, along a length of the elongated channel to a nozzle disposed at a second, opposite end of the elongated channel (704). Because of the configuration of the fluid ejector, e.g., the uniform width of the elongated channel, at least 60%, at least 70%, at least 80%, at least 90%, or at least 95% of the fluid flow induced by the deformation of the membrane is along the length of the elongated channel, in a direction extending from the first end to the second end of the elongated channel.

The fluid flow results in ejection of a droplet of fluid from the nozzle of the fluid ejector (706). Fluid that is not ejected from the nozzle flows into one or more recirculation channels disposed at the second end of the elongated channel (708), where it is returned via the return manifolds to a reservoir and reused for a subsequent ejection operation. Responsive to the ejection of a droplet of fluid from the nozzle, fluid is drawn into the elongated channel from one or more inlet channels disposed at the first end of the elongated channel to refill the fluid ejector (710). The impedance of each of the one or more inlet channels is greater than the impedance of the elongated channel, e.g., at least ten times, at least 20 times, or at least 50 times greater. The impedance of each of the one or more recirculation channels is greater than the impedance of the elongated channel, e.g., at least ten times, at least 20 times, or at least 50 times greater.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for ejecting fluid from a fluid ejector, the method comprising:

actuating a piezoelectric actuator to cause deformation of a membrane defining a wall at a first end of an elongated channel of the fluid ejector, the deformation of the membrane causing ejection of a droplet of fluid from a nozzle disposed at a second end of the channel, wherein the elongated channel fluidically connects a first channel to the nozzle, the first channel disposed at the first end of the elongated channel, and wherein an impedance of the first channel is at least ten times greater than an impedance of the elongated channel, and wherein deformation of the membrane induces fluid flow along the elongated channel, and wherein at least 60% of the fluid flow induced by the deformation of the membrane is in a direction extending from the first end of the elongated channel to the second end of the elongated channel.

2. The method of claim 1, wherein at least 80% of the fluid flow induced by the actuation is in the direction extending from the first end of the elongated channel to the second end of the elongated channel.

3. The method of claim 2, wherein at least 90% of the fluid flow induced by the actuation is in the direction extending from the first end of the elongated channel to the second end of the elongated channel.

4. The method of claim 1, wherein the impedance of the first channel is at least twenty times greater than the impedance of the elongated channel.

5. The method of claim 4, wherein the impedance of the first channel is at least fifty times greater than the impedance of the elongated channel.

6. The method of claim 1, comprising ejecting a droplet of fluid from the nozzle responsive to actuation of the piezoelectric actuator.

7. The method of claim 6, comprising flowing fluid that is not ejected from the nozzle into a second channel disposed at the second end of the elongated channel.

8. The method of claim 7, wherein an impedance of the second channel is at least ten times greater than an impedance of the elongated channel.

9. The method of claim 6, comprising after ejection of a droplet from the nozzle, drawing fluid into the elongated channel from the first channel, second channel, or both.

10. The method of claim 1, wherein the elongated channel has a uniform width along the length of the elongated channel.

11. The method of claim 1, wherein the elongated channel has a uniform impedance along the length of the elongated channel.

12. The method of claim 1, wherein a cross sectional area of the inlet channel is less than a cross sectional area of the elongated channel.

13. The method of claim 1, in which the extent of a clear area of the membrane is greater than or equal to a width of the elongated channel.

14. The method of claim 13, in which the extent of the clear area of the membrane is between 0 and 30% greater than the width of the elongated channel.

15. A fluid ejection apparatus comprising:

a first channel;

a nozzle;

an elongated channel fluidically connecting the first channel to the nozzle, wherein the first channel is disposed at the first end of the elongated channel and the nozzle is disposed at the second end of the elongated channel; and an actuator comprising:

a membrane defining a wall at a first end of the elongated channel; and a piezoelectric element positioned to apply an actuation force to fluid in the elongated channel, the membrane being disposed between the piezoelectric element and an interior of the elongated channel;

wherein an impedance of the first channel is at least ten times greater than an impedance of the elongated channel, and wherein, during operation of the fluid ejection apparatus, deformation of the membrane induces fluid flow along the elongated channel such that at least 60% of the fluid flow induced by the deformation of the membrane is in a direction extending from the first end of the elongated channel to the second end of the elongated channel.

16. The fluid ejection apparatus of claim 15, wherein the impedance of the inlet channel is at least twenty times greater than the impedance of the elongated channel.

17. The fluid ejection apparatus of claim 16, wherein the impedance of the inlet channel is at least fifty times greater than the impedance of the elongated channel.

18. The fluid ejection apparatus of claim 15, wherein a width of the elongated channel is substantially uniform along the entire length of the elongated channel.

19. The fluid ejection apparatus of claim 15, comprising a second channel disposed at the second end of the elongated channel.

20. The fluid ejection apparatus of claim 19, wherein an impedance of the second channel is at least ten times greater than the impedance of the elongated channel.

21. The fluid ejection apparatus of claim 15, wherein the piezoelectric actuator is centered about an axis of the elongated channel.

22. The fluid ejection apparatus of claim 15, wherein the membrane has a thickness of between 0.1 μm and 20 μm.

23. The fluid ejection apparatus of claim 22, wherein the membrane has a thickness of between 2 μm and 8 μm.

24. The fluid ejection apparatus of claim 15, wherein the membrane extends across an entire width of the elongated channel.

25. The fluid ejection apparatus of claim 15, wherein a cross sectional area of the inlet channel is less than a cross sectional area of the elongated channel.

26. The fluid ejection apparatus of claim 15, in which the extent of a clear area of the membrane is greater than or equal to a width of the elongated channel.

27. The method of claim 26, in which the extent of the clear area of the membrane is between 0 and 30% greater than the width of the elongated channel.

28. A printhead comprising an array of fluid ejectors, each fluid ejector of the array comprising:

a first channel;

a nozzle;

an elongated channel fluidically connecting the first channel to the nozzle, wherein the first channel is disposed at the first end of the elongated channel and the nozzle is disposed at the second end of the elongated channel; and an actuator comprising:

a membrane defining a wall at a first end of the elongated channel; and a piezoelectric element positioned to apply an actuation force to fluid in the elongated channel, the membrane being disposed between the piezoelectric element and an interior of the elongated channel;

wherein an impedance of the first channel is at least ten times greater than an impedance of the elongated channel, and wherein, during operation of the fluid ejection apparatus, deformation of the membrane induces fluid flow along the elongated channel such that at least 60% of the fluid flow induced by the deformation of the membrane is in a direction extending from the first end of the elongated channel to the second end of the elongated channel.

29. The printhead of claim 28, wherein the array comprises a parallelogram shaped array of fluid ejectors.

* * * * *